G. M. DAVENPORT.
AUTOMOBILE WHEEL AND TIRE.
APPLICATION FILED APR. 14, 1913.
1,077,044.
Patented Oct. 28, 1913.
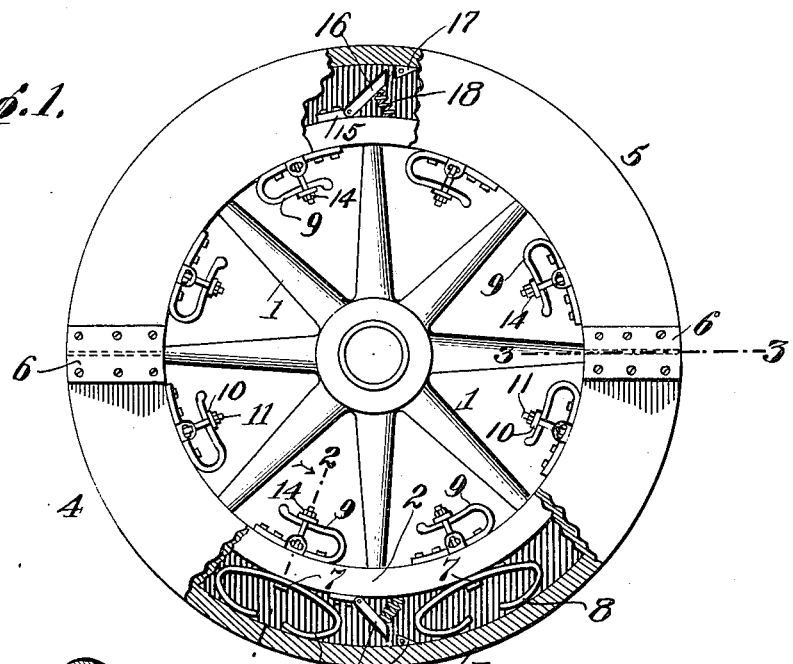
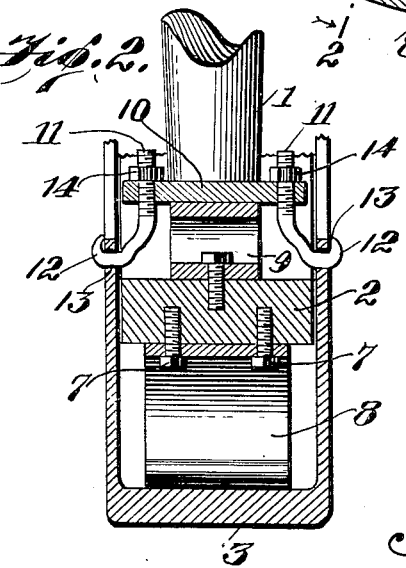
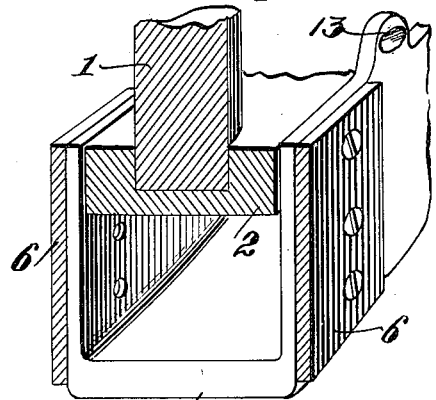
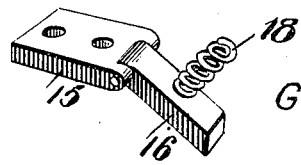
WITNESSES:
INVENTOR
GEORGE M. DAVENPORT.
BY
William S. Jones
ATTORNEY

UNITED STATES PATENT OFFICE.

GEORGE M. DAVENPORT, OF KEO, ARKANSAS.

AUTOMOBILE WHEEL AND TIRE.

1,077,044.  Specification of Letters Patent.  Patented Oct. 28, 1913.

Application filed April 14, 1913. Serial No. 761,028.

*To all whom it may concern:*

Be it known that I, GEORGE M. DAVENPORT, a citizen of the United States, residing at Keo, in the county of Lonoke and State of Arkansas, have invented certain new and useful Improvements in Automobile Wheels and Tires, of which the following is a specification.

My invention relates to vehicle wheels, and the primary object of the invention is to provide a resilient or cushion tire in contra-distinction to a pneumatic tire, the said improvement thoroughly absorbing all shocks encountered during rough travel and entirely eliminating punctures and blow outs.

A further object of the invention is to provide a wheel for automobiles or similar vehicles which is more durable and serviceable and which can be manufactured at less cost than the ordinary tires.

A still further object contemplated by the invention is the provision of means for preventing relative movement of the wheel proper and the tire and thereby insuring a substantially rigid and compact structure.

To the accomplishment of the recited objects and others coördinate therewith, the preferred embodiment of my invention resides in that construction and arrangement of parts hereinafter described, illustrated in the accompanying drawings, and embraced within the scope of the appended claims.

In said drawings:—Figure 1 is a side elevation of a wheel embodying my invention, the same being partly broken away to more clearly show the construction. Fig. 2 is a transverse sectional view taken along lines 2—2 of Fig. 1. Fig. 3 is a perspective view partly in section of the rim, tire and coupling sleeve, and Fig. 4 is a detail perspective view of one of the pivoted stops.

Referring more particularly to the drawings for a detail description of my invention, the numeral 1 designates the spokes and 2 the rim or felly of a wheel. The rim is telescopically mounted in a substantially U-shaped tire 3 which is preferably formed in sections 4 and 5 with the adjacent edges thereof joined together on opposite sides by the coupling plates 6. Arranged circumferentially in spaced relation about the rim, and suitably secured thereto by means of screws, as 7, are a plurality of bowed springs 8, the free extremities of which lie in contact with the inner periphery of the tire and manifestly serve to neutralize all shocks and blows which are received by the tire. In order to further provide for yieldable connection between the felly and the tire, I mount an auxiliary leaf spring 9 upon the inner side of the felly directly opposite each of the main springs, and employ coöperating means by which the yieldability may be adjusted. This means comprises a bar 10 disposed transversely of the outer face of each spring 9, and bolts 11 arranged at the opposite terminals of said bar, the depending extremities of the bolts being outwardly deflected and fashioned in hooks, as 12, for engagement with the elongated slots 13 of the sides of the tire. By simply operating the nuts 14 in either direction, it will be seen that any suitable tension may be placed upon the hooks 12 so that they will resume their positions in the elongated slots 13 when the weight or load of the vehicle has been removed.

Interposed between two adjacent springs 8, and preferably at diametrically opposite points of the rim are secured plates 15 carrying pivoted dogs 16 which are pressed outwardly in engagement with the lugs 17, projecting inwardly from the tire, by means of coil springs 18. The pivoted dogs are pointed in opposite directions and coact with the lugs to permit of a slight relative movement of the tire and rim If desired, grease may be inserted between the felly and the rim in order to minimize friction and noise.

It should be understood that in its broader aspects my invention comprehends not only the employment of the means described, but of similar means for performing the recited functions. It is desired to reserve the right to effect such modifications and variations as may come fairly within the scope of the appended claims. For example, if the exigencies of any particular case should require the use of an ancillary rubber tire upon the main tire this may be added without departing from the spirit of my invention.

What is claimed, is:—

1. A wheel comprising a felly, a tire inclosing said felly and having oppositely arranged elongated slots, main springs interposed between the felly and the tire, auxiliary springs mounted upon the felly, a bar disposed transversely of each of the last mentioned springs, and adjusting bolts mounted at the outer ends of said bar and engaging said slots.

2. A wheel comprising a felly, a tire inclosing said felly and having oppositely arranged elongated slots, main springs interposed between the felly and the tire, auxiliary springs mounted upon the felly, a bar disposed transversely of each of the last mentioned springs, adjusting bolts mounted at the outer ends of said bar and engaging said slots, projections mounted upon the inside of said tire and yieldable pivoted dogs adapted for engagement with said projections.

In testimony whereof I hereunto affix my signature in presence of two witnesses.

GEORGE M. DAVENPORT.

Witnesses:
L. S. DANIEL,
B. A. WATTS.